Dec. 24, 1940.  S. G. BROWN  2,225,855
VARIABLE ELECTRICAL CONDENSER
Filed Jan. 17, 1939
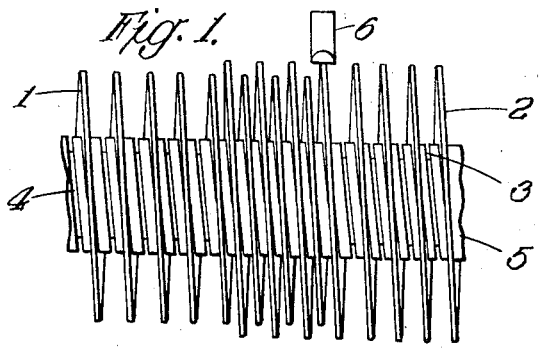
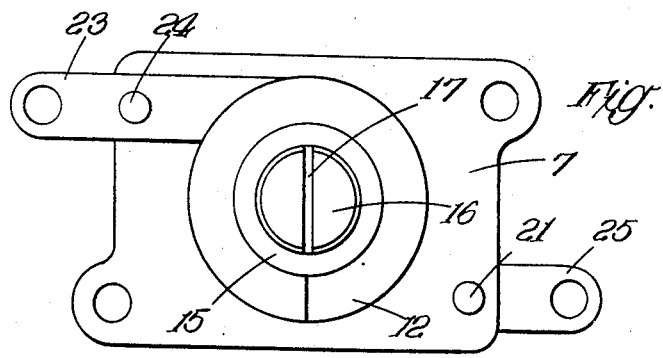
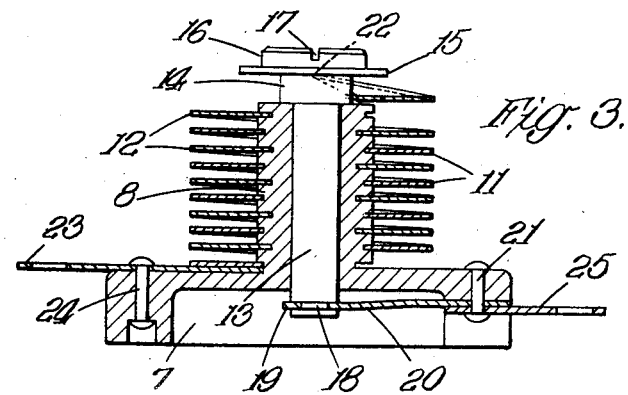
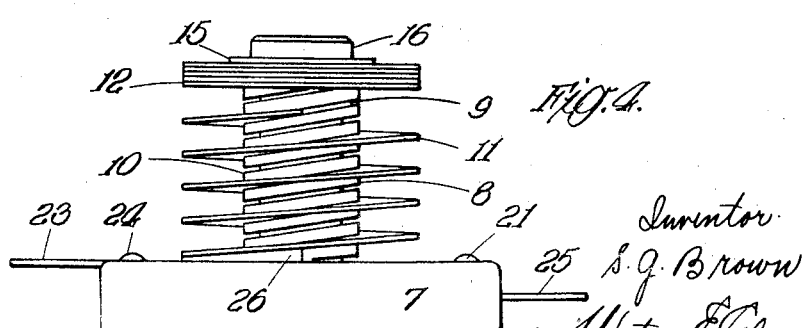
Inventor
S. G. Brown
By Watson E. Coleman
Attorney.

Patented Dec. 24, 1940

2,225,855

UNITED STATES PATENT OFFICE 2,225,855

VARIABLE ELECTRICAL CONDENSER

Sidney George Brown, London, England, assignor to The Telegraph Condenser Company Limited, North Acton, England, a British company Application January 17, 1939, Serial No. 251,418
In Great Britain January 19, 1938

2 Claims. (Cl. 175—41.5)

The present invention relates to electrical condensers of the type wherein the capacity is variable by virtue of the fact that one of the electrodes of the condenser is movable in relation to the other. Such variable condensers are often employed for the tuning of a wireless set or for trimming purposes, that is to say, for providing a means of effecting a small adjustment in a total capacity mainly constituted by a larger condenser.

An object of the invention is the production of a variable electrical condenser comprising in combination an electrode formed as a helix and a second electrode also formed as a co-axial helix whereof the convolutions lie between those of said first-mentioned helix, said electrodes being relatively rotatable about their common axis whereby their degree of interlacing may be varied.

Another object of the invention is the provision of a variable electrical condenser wherein the construction comprises a stem of insulating material having at least two helical grooves in its periphery and an electrode located in and projecting radially from each of said grooves, at least certain of said electrodes being rotatable relatively to each other about said stem.

A further object of the invention is the construction of a variable electrical condenser as in the preceding paragraph having a metal spindle rotatable within the said stem to which the movable electrode or electrodes is or are attached and whereby adjustment of the capacity is effected.

Other objects and advantages of the invention will appear from the following description, which includes reference to the accompanying drawing, wherein:

Figure 1 illustrates the essential features of a condenser having interlacing helical electrodes, as already known, Figure 2 is a plan view, Figure 3 is a sectional view, and Figure 4 is an outside elevation of a preferred form of construction according to the present invention.

Referring to Figure 1, the electrodes of the condenser comprise metal strips wound edgewise to constitute two helices 1, 2; alternatively these helices might be of insulating material coated with an electrically conducting substance. The electrodes are respectively supported in helical grooves 3, 4 formed in the surface of a central insulating stem 5, conveniently made of ceramic material, Bakelite or any other appropriate insulator. The electrode 1 is fixed in its groove 3 and connection to an external circuit may be made by soldering a wire thereto, by means of a screw terminal or in any other suitable manner not shown. The electrode 2 is a sliding fit in its groove 4, thus permitting its rotation whereby its convolutions may be interlaced in varying degree with those of the electrode 1, thus providing the desired adjustability of electrical capacity. To effect electrical connection from the movable electrode 2 to an external circuit, a metal spring 6 bears on the periphery of the electrode.

In the case of the above-described construction of condenser, it is evident that, in order that it may be adjusted to its minimum capacity, that is when there is no interlacing between the helices, the effective length is at least twice that of one helix; this may be regarded as a disadvantage, which is avoided in the construction according to the present invention depicted in Figures 2, 3 and 4.

This form of condenser comprises a base 7 of ceramic material, Bakelite or other suitable insulating substance, provided with a central stem 8 having two helical grooves 9, 10 of unequal depth. In the shallower groove 9 the fixed electrode 11 is located and the electrode 12, relatively movable, occupies the deeper groove 10. Extending through the stem 8, there is a spindle 13, of conducting material, having a shoulder 14, a flange 15 and a head 16 formed with a saw cut 17 to facilitate rotation of the spindle. At its opposite end, the spindle 13 has a peripheral groove 18, engaged by the forked end 19 of a metal arm 20 fixed to the base 7 by a rivet 21; axial movement of the spindle is thus prevented, while it is free to rotate in the stem 8. One end of the movable electrode 12 is attached at 22 to the flange 15, whereby, on rotation of the spindle 13, the degree with which the electrode 12 is interlaced with the electrode 11, is varied.

In Figure 3 the electrodes are shown as fully interlaced, providing maximum capacity, while in Figure 4 they are depicted as completely disengaged, resulting in minimum capacity; in the latter position, on account of the above-described mechanism, the electrode 12 is compressed so that the distance between its convolutions is reduced or even eliminated. When the spindle 13 is rotated from the position of minimum capacity shown in Figure 4 in such a direction as to increase the capacity, the end of the electrode 12 enters the deeper groove 10 designed for it and therefore remains correctly spaced from the electrode 11. Attached to the latter is a soldering tag 23 fixed to the base 7 by a rivet 24, while connection to the movable electrode 12 is effected by a tag 25 held by the rivet 21. Movement of the electrode 12 may be limited by a stop 26 and a similar stop may be provided for locating the electrode 11.

In the condensers illustrated variation of capacity is substantially proportional to the degree of rotation of the movable electrode. If desired, however, the width of the strip may be varied in any desired manner to form, for instance, a tapered coil or helix, or any other desired shape, thereby enabling the increase or decrease of capacity to vary in any predetermined manner. Alternatively, the pitch of the screw thread may be varied along its length if desired, to form any predetermined variation of capacity to the turns of one element in relation to the other.

The invention is susceptible of many structural variations. For instance, if desired, the elements may be so arranged that the periphery of the convolutions is caused to engage within an internal thread of a housing instead, as previously described, upon a central stem. In some cases it may be desirable and convenient to dispense with the threaded stem or housing in which case the spacing between the coils or convolutions could be maintained by the addition of suitable insulators attached thereto.

In the constructions described above there are two spiral elements, one fixed and the other movable, but it will be apparent that more than two elements can be used and the number of fixed elements and movable elements arranged as desired.

In the drawing, the variable electrical condenser is shown as a single unit, but in some cases, for instance, for use in a wireless receiver, it is often convenient to arrange several such condensers in one unit. In this case the base 1 could be extended and the threaded stems added as required.

Each of the helical electrodes may be produced as an end-on shaving cut from a solid bar or tube of a suitable conducting material. The requisite thickness of the said helical shaving may be readily secured by a suitable feed of the cutter in relation to the number of revolutions of the bar or the like from which the helix is to be cut. Of course, if desired, the section of the said shaving may be varied to meet requirements; for instance, the cutter may be so shaped as to produce a corrugated shaving or a curved form.

What I claim and desire to secure by Letters Patent of the United States is:

1. A variable electrical condenser, comprising in combination a stem of insulating material having two helical grooves in its periphery, a conducting spindle rotatable within said stem, an electrode located in and projecting radially from each of said grooves, one of said electrodes being movable around said stem and mechanically connected with said spindle and the other of said electrodes being fixed relatively to said stem, said spindle having a peripheral groove, and an arm fixed at one end relatively to the stem and at its other end having a fork having operative engagement in said groove.

2. A variable electrical condenser, comprising a stem of insulation material having two helical grooves in its periphery, a current conducting spindle rotatable in and extending through said stem, a helical electrode located in and projecting radially from each of said grooves, one of said electrodes being movable around said stem, a flange around an end of said spindle and spaced from the adjacent end of said stem, and said movable electrode being attached at one end to said flange and being drawn into the space between the flange and the said end of the stem when the spindle is turned in one direction, the other electrode being fixed relatively to the stem.

SIDNEY GEORGE BROWN.